(12) United States Patent
Dungskog

(10) Patent No.: US 7,872,421 B2
(45) Date of Patent: Jan. 18, 2011

(54) DEVICE FOR FLUORESCENT TUBE ARMATURES

(75) Inventor: Tage Dungskog, Jönåker (SE)

(73) Assignee: Patica AB, Nyköping (SE)

( * ) Notice: Subject to any disclaimer, the term of this patent is extended or adjusted under 35 U.S.C. 154(b) by 233 days.

(21) Appl. No.: 12/087,581

(22) PCT Filed: Feb. 8, 2007

(86) PCT No.: PCT/SE2007/050079

§ 371 (c)(1),
(2), (4) Date: Aug. 6, 2008

(87) PCT Pub. No.: WO2007/091972

PCT Pub. Date: Aug. 16, 2007

(65) Prior Publication Data

US 2009/0001900 A1    Jan. 1, 2009

(30) Foreign Application Priority Data

Feb. 9, 2006 (SE) ................................. 0600288

(51) Int. Cl.
*H05B 37/00* (2006.01)
(52) U.S. Cl. .............................. 315/56; 315/58; 315/62; 362/240; 362/545
(58) Field of Classification Search ............. 315/51–63; 362/227, 240, 234, 231, 223, 545
See application file for complete search history.

(56) References Cited

U.S. PATENT DOCUMENTS

| 5,303,124 | A | 4/1994 | Wrobel |
| 5,463,280 | A | 10/1995 | Johnson |
| 5,688,042 | A | 11/1997 | Madadi et al. |
| 6,388,393 | B1 | 5/2002 | Illingworth |
| 2003/0102810 | A1 | 6/2003 | Cross et al. |
| 2004/0012959 | A1 | 1/2004 | Robertson et al. |
| 2007/0183156 | A1* | 8/2007 | Shan .......................... 362/277 |
| 2008/0094837 | A1* | 4/2008 | Dobbins et al. ............. 362/249 |

FOREIGN PATENT DOCUMENTS

| DE | 4202776 A1 | 8/1993 |
| ES | 2238200 | 8/2005 |
| RU | 94018914 | 1/1996 |
| WO | WO 0051403 A1 | 8/2000 |

OTHER PUBLICATIONS

Decision on Grant from Russian Patent Office (with English translation), May 17, 2010.
Canadian Official Action dated Jun. 25, 2010 in corresponding Canadian Application No. 2,640,805.
Extended European Search Report dated Apr. 26, 2010.

* cited by examiner

*Primary Examiner*—David Hung Vu
(74) *Attorney, Agent, or Firm*—Buchanan Ingersoll & Rooney PC

(57) ABSTRACT

The present invention relates to a device for fluorescent tube armatures, the device being intended to replace a previously occurring fluorescent tube. The device has a light emitting diode unit (4) comprising at least one electrical drive unit (4.1), which is connected to at least one phase wire, as well as is connected to at least one neutral wire via at least one wire (4.2) comprising at least one light-emitting diode (4.3).

16 Claims, 1 Drawing Sheet

DEVICE FOR FLUORESCENT TUBE ARMATURES

The present invention relates to a device for fluorescent tube armatures, the device being intended to replace an existing fluorescent tube.

PRIOR ART

Fluorescent tubes are based on the fact that a gas mixture of, for instance, argon and mercury vapour emits light at a satisfactory luminous efficiency when the gas is traversed by an electric current. Since this light substantially consists of UV radiation, the fluorescent tubes are coated on the inside with luminescent materials that react with the UV radiation. The fluorescent tubes have a considerable better luminous efficiency than conventional incandescent lamps, and their service life is longer than what is the case for the incandescent lamps, but finally, they still have to be replaced. This may involve an extensive operation, e.g., in public environments, where great amounts of fluorescent tubes are used.

In applications where fluorescent tubes only are used to illuminate signs, such as, e.g., signs with the text "Emergency Exit", a quick replacement is necessary so as not to affect the safety negatively. Furthermore, such armatures are in operation around the clock, which entails that replacement of fluorescent tubes has to be carried out relatively often. A fluorescent tube normally used in these armatures consumes approx. 13 W, which, together with the long operating time, also implies a considerable energy consumption if many fluorescent tubes are used in a large establishment complex.

SUMMARY OF THE INVENTION

A first object of the present invention is to decrease the need for replacing fluorescent tubes in armatures. A second object of the present invention is to decrease the energy consumption. Thus, the invention comprises a device for fluorescent tube armatures, the device being intended to replace a previously occurring fluorescent tube. The device has a light-emitting diode unit comprising at least one electrical drive unit, which is connected to at least one phase wire, as well as is connected to at least one neutral wire via at least one wire comprising at least one light-emitting diode. The light-emitting diode unit may be a bar, one end of which is connected to a first contact base, which is connected with said at least one phase wire, and the other end of which is connected to a second contact base, which is connected with said at least one neutral wire. Each one of said at least one wire between said at least one drive unit and said at least one neutral wire may have two or more light-emitting diodes connected in series.

LIST OF FIGURES

DESCRIPTION OF EMBODIMENTS

Figure 1:
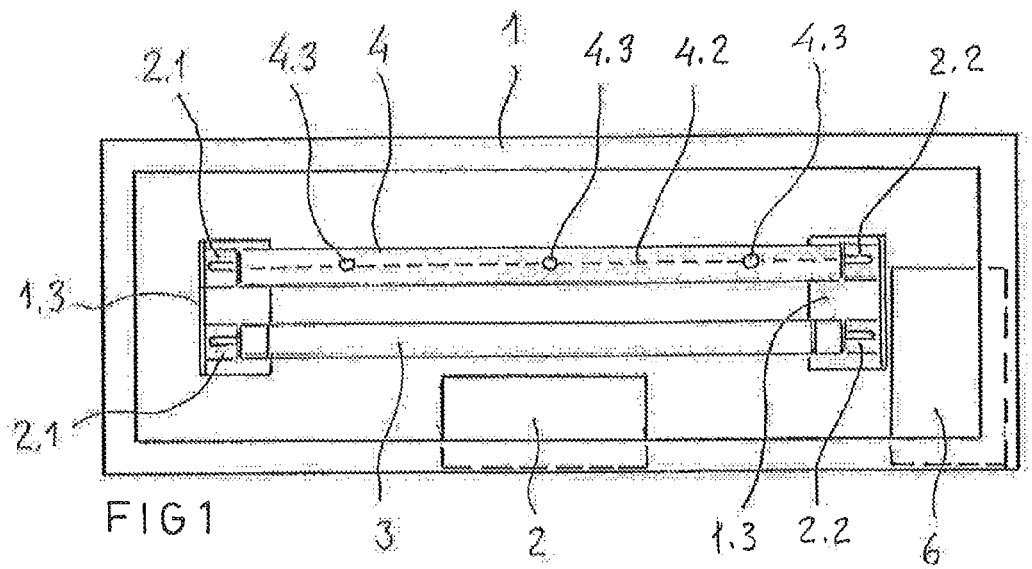
FIG. 1 shows, in a front view, an armature provided with a device according to the invention and intended for a sign (not shown) with text.
Figure 2:
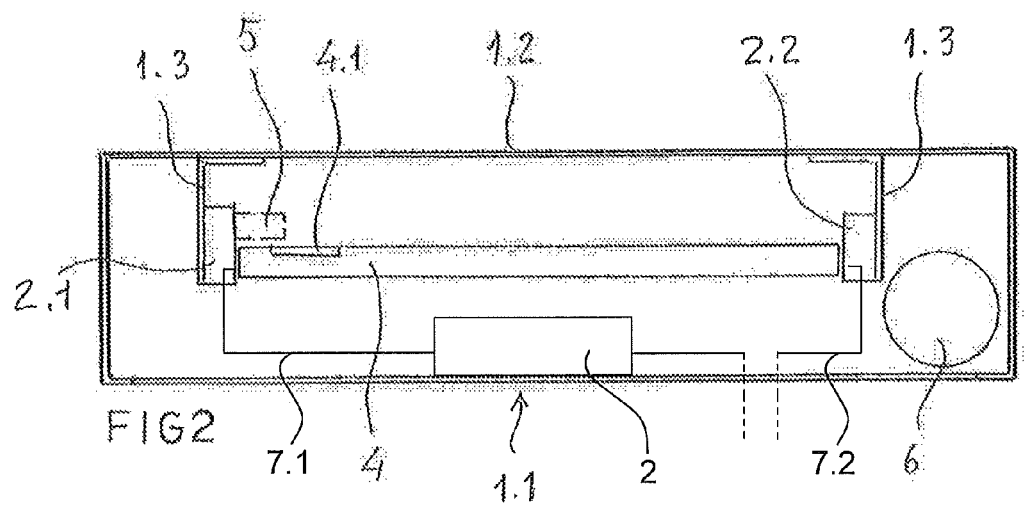
FIG. 2 shows, in a view from above, the armature according to FIG. 1.

As is seen in FIGS. 1 and 2, an exemplary armature comprises a box-shaped casing 1 of sheet-metal plate or another suitable material, the front side 1.1 of which is intended to carry a transilluminatable front, which, however, is not shown in the figures. On the rear wall 1.2 of the casing 1, two brackets 1.3 of sheet-metal plate are fixedly arranged at a horizontal distance from each other. On the bottom of the casing 1, an inductor, a so-called choke, 2 is arranged, which is connected with an electrical phase wire. Each one of the brackets 1.3 carries two contact bases 2.1, 2.2 arranged above each other and in pairs intended to receive fluorescent tubes 3. An exemplary fluorescent tube 3 is shown fitted in the lower pair of contact bases 2.1, 2.2. The upper left contact base 2.1 is connected with a phase wire 7.1 from the inductor 2, while the upper right contact base 2.2 is connected with a neutral wire 7.2.

In the upper pair of contact bases 2.1, 2.2, a light-emitting diode bar 4 according to the invention is fixed as a replacement for the fluorescent tube normally positioned there. Furthermore, in the upper left contact base 2.1, a glow switch 5 is normally arranged for the lighting of a fluorescent tube. Here, said glow switch 5 is removed since it is not needed, and is shown dashed in FIG. 2. The light-emitting diode bar 4 comprises an electrical drive unit 4.1, which is connected to a phase wire 7.1 from the inductor 2 via the left contact base 2.1, as well as is connected to the neutral wire 7.2 in the right contact base 2.2 via a wire 4.2 on which three light-emitting diodes 4.3 connected in series are arranged. The length of the light-emitting diode bar 4, as well as the number of light-emitting diodes 4.3, may vary depending on the length of the original fluorescent tube and the desired light intensity. The light-emitting diodes 4.3 may be provided with reflectors and be vertically and horizontally adjustable. Light-emitting diodes of the kind in question have considerable lower energy consumption than corresponding fluorescent tubes, and therefore the power can be decreased from approx. 13 W to approx. 3 W.

The fluorescent tube 3 shown in FIG. 1, which is arranged in the lower pair of contact bases 2.1, 2.2, is intended to be turned on upon a possible power failure, and is, on that occasion, supplied with current from an electric accumulator 6 having an drive unit pertaining thereto. This fluorescent tube may also be replaced by a light-emitting diode bar according to the invention, which is adapted to accumulator operation. Normally, the operating time of said fluorescent tube is very short, and therefore it does not need to be replaced so often. However, the operating time at accumulator operation can be increased considerably upon a substitution to a light-emitting diode bar according to the invention.

When substituting an occurring fluorescent tube by a light-emitting diode unit, the occurring glow switch is disconnected, alternatively removed from the seat thereof, the occurring power connection between the phase side and neutral side of the fluorescent tube being interrupted. Hence, no other disconnections or switchings need to be made.

The invention is not limited to the embodiments shown herein but may be varied within the scope of the subsequent claims.

The invention claimed is:

1. Device intended to replace a fluorescent tube in a fluorescent tube armature, the device comprising a light-emitting diode unit having a first and second end and at least one electrical drive unit, wherein the drive unit is adapted to be connected, when the first and second ends of the light-emitting diode unit are each inserted into a respective contact base of a fluorescent tube armature, to at least one phase wire, the phase wire connected with one of said contact bases and to at least one inductor included in the fluorescent tube armature, at least one neutral wire connected with the other of said contact bases, and to at least one wire comprising at least one light-emitting diode.

2. The device according to claim 1, wherein the at least one wire comprising the at least one light-emitting diode has two or more light-emitting diodes connected in series.

3. The device according to claim 1, wherein the at least one light-emitting diode is connected to at least one wire connecting the drive unit with the neutral wire.

4. The device according to claim 3, wherein the at least one wire comprising the at least one light-emitting diode has two or more light-emitting diodes connected in series.

5. A fluorescent tube armature arrangement comprising:
   a fluorescent tube armature comprising a first and a second contact base for receiving a fluorescent tube, and an inductor, the first contact base being connected with the inductor via a phase wire and the second contact base being connected with a neutral wire; and
   a light-emitting diode unit having a first end and a second end inserted into a respective one of said first and second contact bases,
   wherein the light-emitting diode unit has at least one electrical drive unit which is connected to the phase wire in the first contact base through one end of the light-emitting diode unit, and to the neutral wire in the second contact base through the other end of the light-emitting diode unit, and to at least one wire comprising at least one light-emitting diode.

6. The fluorescent tube armature arrangement according to claim 5, wherein the at least one light-emitting diode is connected to at least one wire connecting the drive unit with the neutral wire.

7. The fluorescent tube armature arrangement according to claim 5, wherein the at least one wire comprising the at least one light-emitting diode has two or more light-emitting diodes connected in series.

8. The fluorescent tube armature arrangement according to claim 6, wherein the at least one wire comprising the at least one light-emitting diode has two or more light-emitting diodes connected in series.

9. The fluorescent tube arrangement according to claim 5, wherein the fluorescent tube armature comprises a seat for a glow switch, and wherein no glow switch is present in said seat.

10. The fluorescent tube arrangement according to claim 6, wherein the fluorescent tube armature comprises a seat for a glow switch, and wherein no glow switch is present in said seat.

11. The fluorescent tube arrangement according to claim 7, wherein the fluorescent tube armature comprises a seat for a glow switch, and wherein no glow switch is present in said seat.

12. The fluorescent tube arrangement according to claim 8, wherein the fluorescent tube armature comprises a seat for a glow switch, and wherein no glow switch is present in said seat.

13. A device adapted to replace a fluorescent tube in a fluorescent tube armature, the fluorescent tube armature comprising a first and a second contact base for receiving the fluorescent tube, and an inductor, the first contact base being connected with the inductor via a phase wire and the second contact base being connected with a neutral wire,
   the device comprising a light-emitting diode unit having a first and a second end, at least one electrical drive unit, and at least one wire comprising at least one light-emitting diode,
   wherein the first end is adapted to be connected to the first contact base, the second end is adapted to be connected to the second contact base,
   wherein the drive unit is adapted to be connected, when the first and second ends of the light-emitting diode unit are each inserted into the respective contact bases of a fluorescent tube armature, to the at least one phase wire and the inductor, to the neutral wire connected with the second contact base, and to the at least one wire comprising at least one light-emitting diode.

14. The device according to claim 13, wherein the at least one light-emitting diode is connected to at least one wire connecting the drive unit with the neutral wire.

15. The device according to claim 13, wherein the at least one wire comprising the at least one light-emitting diode has two or more light-emitting diodes connected in series.

16. The device according to claim 14, wherein the at least one wire comprising the at least one light-emitting diode has two or more light-emitting diodes connected in series.

* * * * *

UNITED STATES PATENT AND TRADEMARK OFFICE
CERTIFICATE OF CORRECTION

PATENT NO. : 7,872,421 B2
APPLICATION NO. : 12/087581
DATED : January 18, 2011
INVENTOR(S) : Tage Dungskog Page 1 of 1

It is certified that error appears in the above-identified patent and that said Letters Patent is hereby corrected as shown below:

Title Page, item (73) should read as follows:

--(73) Assignee: TD Light Sweden AB, Nyköping (SE)--

Signed and Sealed this
Twentieth Day of December, 2011

David J. Kappos
*Director of the United States Patent and Trademark Office*